Oct. 15, 1946.  H. C. DRAKE  2,409,553
RAIL FLAW DETECTOR MECHANISM
Filed April 13, 1943  5 Sheets-Sheet 1

INVENTOR.
HARCOURT C. DRAKE
BY
Joseph H. Lipschutz
ATTORNEY

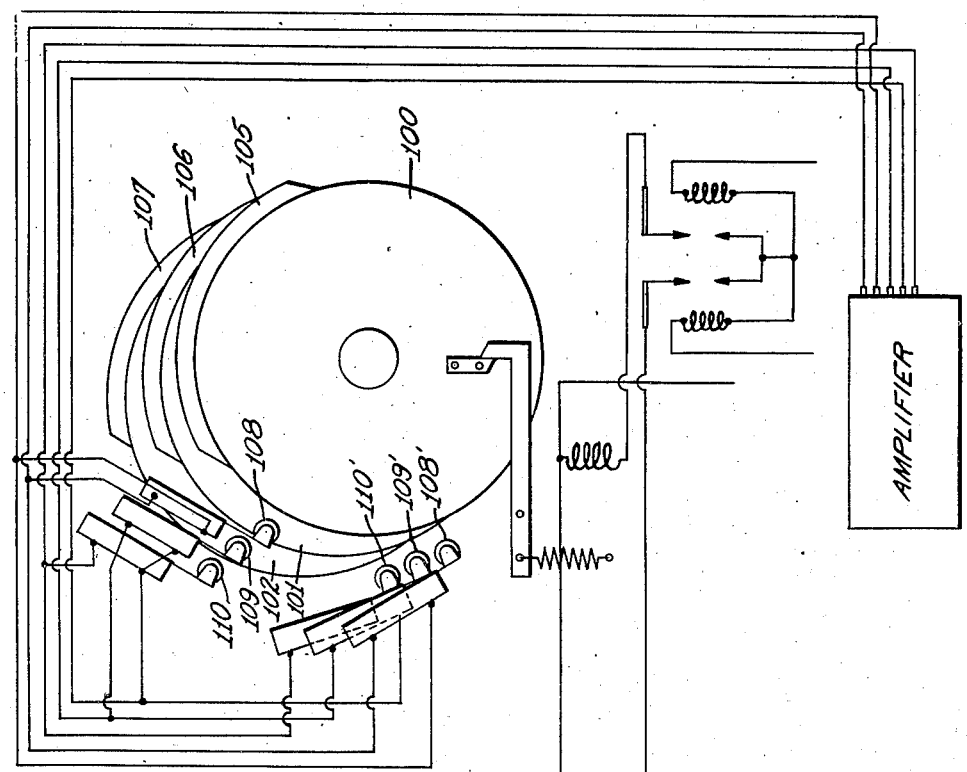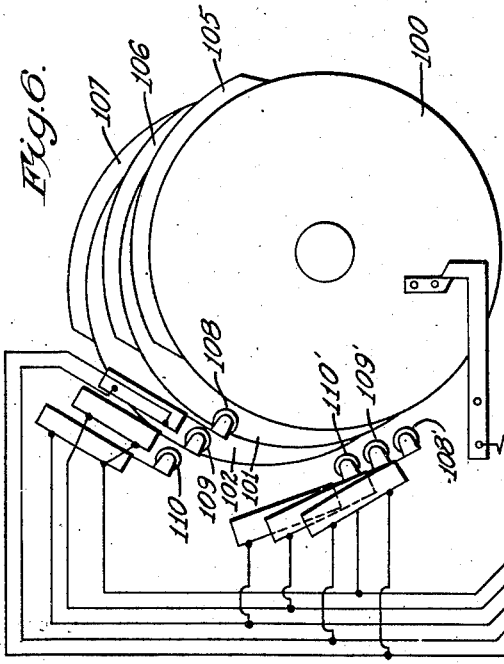
Fig. 6.
INVENTOR.
HARCOURT C. DRAKE

Oct. 15, 1946.   H. C. DRAKE   2,409,553
RAIL FLAW DETECTOR MECHANISM
Filed April 13, 1943   5 Sheets-Sheet 5

INVENTOR.
HARCOURT C. DRAKE
BY
Joseph H. Lipschutz
ATTORNEY

Patented Oct. 15, 1946

2,409,553

UNITED STATES PATENT OFFICE 2,409,553

RAIL FLAW DETECTOR MECHANISM

Harcourt C. Drake, Hempstead, N. Y., assignor to Sperry Products, Inc., Hoboken, N. J., a corporation of New York Application April 13, 1943, Serial No. 482,848

14 Claims. (Cl. 175—183)

This invention relates to rail flaw detector mechanisms such as are now employed on the Sperry rail flaw detector cars. These cars run along the railroad tracks and pass current continuously through the rails between spaced contact brushes to set up an electromagnetic field surrounding the rail. Flaws in the rail caused by fissures are discovered by reason of the fact that they set up non-uniform regions in the said electromagnetic field. Such non-uniformities are detected by means such as induction coils maintained at a constant distance above the rail head, the coils normally cutting a constant number of lines of force, but on encountering a region of flaw they cut a different number of lines of force to generate a differential electromotive force which, after being suitably amplified, may be caused to operate indicating means. Such indicating means may take the form of one or more pens operating on a moving chart within the car, and also the deposit of paint on the rail in the region of flaw by reason of a simultaneous operation of a paint gun.

It will be understood that rail joints which consist of angle bars, bolts, etc., serving to connect the adjacent rail ends will also cause non-uniformity in the electromagnetic field surrounding the rail, and unless means were provided for taking care of this situation such variation in field caused by the angle bar would be picked up in the same manner as an internal fissure, and moreover, would actuate the detector mechanism throughout the entire passage of the mechanism over the angle bar. To prevent such response of the detector mechanism to the entire region of the angle bar, my prior Patent No. 2,069,030 for "Rail fissure detector," granted January 26, 1937, discloses a joint cutout mechanism for the purpose of cutting out the operation of the detector mechanism during the interval that the detector mechanism is passing over an angle bar. The means there employed consist of a plurality of pivotally mounted fingers which extend below the rail head on the gauge side thereof, so that normally the fingers are free of engagement with the rail, but when an angle bar is approached, the fingers will successively be rocked about their pivots to cause the detector mechanism to be rendered ineffective.

In the Sperry rail flaw detector mechanism the detector unit comprises a plurality of sets of detector coils arranged to pass successively over any given rail portion. These sets of detector coils operate into separate input channels of an amplifier, and the outputs from said channels operate separate pens on a moving chart. Heretofore the joint cutout mechanism described above was so arranged that detection ceased when the detector unit, which included a plurality of sets of coils, approached to within about 3" of the angle bar and remained cut out until the last set of coils had passed about 3" beyond the leaving end of the angle bar. It can readily be understood that by the time the last set of coils had passed 3" beyond the angle bar the front set of coils had passed some 9" beyond the angle bar, and this meant that at least 9" of rail at the entering side and another 9" of rail at the leaving side of each angle bar remained untested. In my prior co-pending patent application Serial No. 395,918 for "Rail flaw detector mechanism," filed May 31, 1941, I have provided one solution of the problem thus created, and said solution materially reduced the amount of rail at either end of the angle bar which remained untested by reason of the joint cutout mechanism. For this purpose my prior solution consisted in providing a plurality of sets of joint cutout mechanisms, each set cooperating with a respective set of detector coils so that the front set of coils would be ready for detection as soon as said set of coils had passed about 3" beyond the leaving end of the angle bar, without waiting for the entire rear set of coils to pass said angle bar, as was the case in the original joint cutout mechanism disclosed in my prior Patent No. 2,069,030. Similarly, on approaching an angle bar the rear set of coils which heretofore had been rendered ineffective when the front set of coils was within 3" of the angle bar, now remained effective until the rear set of coils itself, independently of the front set of coils, was within 3" of the angle bar, thus permitting a region of rail close to the angle bar to be tested which heretofore remained untested.

While the solution of a plurality of sets of joint cutout fingers disclosed in my prior application Serial No. 395,918, proved to be effective to permit testing close to angle bars, nevertheless it was found that the multiplicity of joint fingers required a great deal of servicing because these fingers are relatively light, and on meeting foreign obstructions other than the angle bars, as well as by reason of frequent contact with the angle bars, became bent and their bearings became worn. It is therefore one of the principal objects of my invention to provide a joint cutout mechanism which will reduce the number of joint cutout fingers while accomplishing the same result as in my prior application, namely, cutting out detector coils as separate independent units, thus permitting testing close to joints.

Where sets of joint cutout fingers are used to engage the angle bar at both the entering and leaving ends, it has been found that there is a time lag, particularly at the leaving end after the finger has left the bar, until the finger has swung through an arc to render the indicating means again effective. The time necessary for this finger to swing through an arc is constant, but the length of rail traversed by the detector mechanism in this time interval will be a function of the car speed. Thus, at 6 miles per hour, a given piece of rail at the leaving end of the angle bar will be untested, but if the car is moving 9 miles an hour a 50% greater piece of rail will remain untested. It is therefore another object of my invention to provide a joint cutout mechanism wherein the rendering of the indicating mechanism effective and ineffective will be independent of the car speed.

Further objects and advantages of this invention will become apparent in the following detailed description thereof:

In the accompanying drawings,

Fig. 6 is a view similar to Fig. 5 showing a modified form of the invention.

Figure 1:
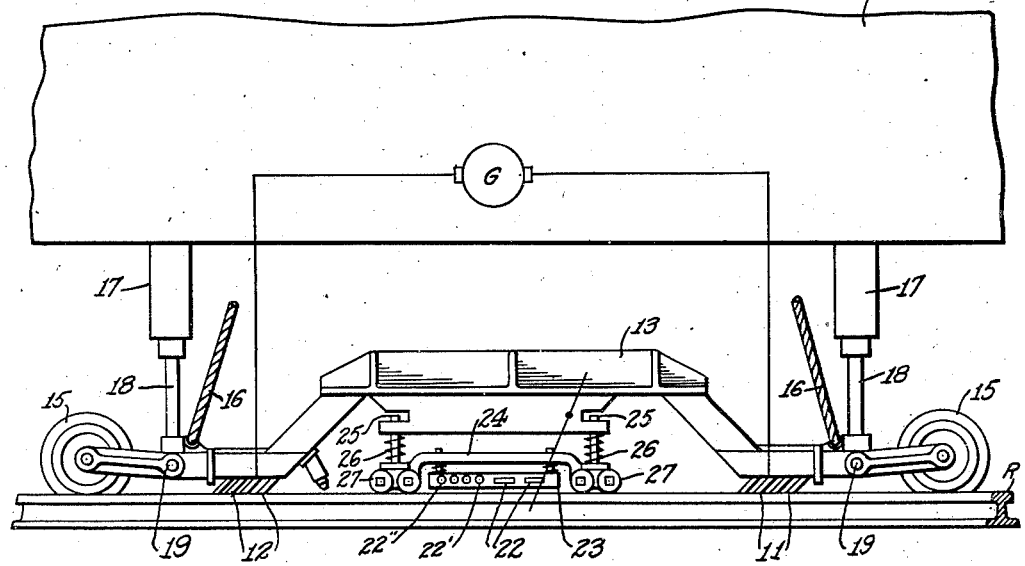
Fig. 1 is a side elevation partly diagrammatic of a portion of a rail fissure detector car showing my invention applied thereto.

Referring to Fig. 1 of the drawings there are shown the parts of a standard Sperry rail fissure detector car which includes a car body 10 operating along the rails R. Fissure detection is accomplished by passing current through each rail from a generator G within the car body supplying current to spaced current brushes 11 and 12 supported upon the current brush carriage 13 which when in lowered effective position is adapted to ride upon the rail by means such as wheels 15. The current brush carriage 13 is normally held in elevated or ineffective position by means of springs not shown, and cables 16, but when it is desired to lower said carriage, fluid pressure such as compressed air is supplied to the cylinders 17 to force out pistons 18, which are pivotally connected at 19 to the current brush carriage 13. The current passed through the rail by way of spaced brushes 11 and 12 will establish an electromagnetic field surrounding the rail, and this field will be uniform except in the region of flaw, where it will be distorted. Such distortions of the electromagnetic field are detected by a flaw responsive mechanism which may take the form of a plurality of induction coils supported in a housing 23 at a constant distance above the rail surface by means of a carriage 24. Said carriage 24 is mounted on current brush carriage 13 by means of loosely fitting bolts 25 and springs 26 to permit said carriage 24 while riding on the rail on means such as wheels 27, to move independently of carriage 13 so that said carriage may at all times maintain parallelism with the rail surface regardless of irregularities thereof. The flaw responsive mechanism may include one or more pairs of coils, three such pairs being shown in the present instance, one pair 22 being positioned with their axes parallel to the longitudinal axis of the rail, while the other pairs of coils 22' and 22'' are positioned with their axes transverse of the longitudinal axis of the rail. Each pair of coils is connected in series and oppositely wound so that variations in flux which affect both simultaneously, such as variations in the current supply, or equal variations in the distance of the coils above the rail will affect both equally and oppositely, and thus will not affect the flaw detection. On entering a region of flaw however, first one and then the other of said coils will cut a different number of lines of force from that which was previously cut, to generate a differential electromotive force. Each set of coils operates into a separate channel of an amplifier. The outputs from said channels may be caused to operate suitable indicators (not shown) such as pens on a moving chart.

As stated in the introduction to this specification, an angle bar A comprising tie plates B, and a plurality of bolts C, will distort the electromagnetic field surrounding the rail in the same manner as a fissure, and throughout the entire passage of the detector mechanism over the joint, indications would be coming through on the chart causing continuous actuation of the pens, thus obscuring the chart and making it difficult to read. This is particularly dangerous with respect to actual fissures existing near the angle bars, because it would be impossible to distinguish such a pen indication from the plurality of pen indications immediately adjacent thereto, and caused by the joint construction. For this reason, in the said prior Patent No. 2,069,030 there was provided a pair of spaced fingers mounted on the current brush carriage 11 in advance of and to the rear of the detector coils within housing 23. These fingers were adapted to engage the angle bar when the detector coil approached a region where the angle bar began to distort the electromagnetic field. This region began to distort the electromagnetic field. This region began about 3'' in advance of the angle bar and extended the same distance beyond the leaving end of the angle bar. The two pivoted fingers therefore were so positioned that the first finger engaged the angle bar when the leading detector coil was about 3'' away from the entering end of the angle bar, and controlled a circuit which rendered the indicating mechanism ineffective while the detector mechanism was passing over the angle bar. Before the leading finger had left the angle bar the rear finger engaged said angle bar so that after the leading finger passed beyond the bar the circuit through the indicating mechanism nevertheless remained ineffective because the rear finger was now on the angle bar. The rear finger remained on the angle bar until the rearmost coil had passed the field of distortion created by the bar, which was about 3'' beyond the leaving end thereof, and then the rear finger dropped from the angle bar to render the indicating mechanism again effective. By this time the leading detector coil was about 9'' beyond the leaving end of the angle bar, and therefore this portion of rail normally remained untested. A similar portion remained untested in advance of the angle bar.

In order to avoid the condition of such large untested portions of rail in advance of and beyond each angle bar I conceived the idea in my prior co-pending patent application Serial No. 395,918 of providing a plurality of pairs of joint cutout fingers, each pair cooperating with a set of detector coils. Thus, one pair of fingers was provided to cooperate with the pair of longitudinal coils 22 and another pair of joint cutout fingers was provided to cooperate with the two pairs of transverse coils 22' and 22". By this arrangement each set of coils could be rendered ineffective and effective as soon as it approached and left the region of distortion of the angle bar, which is to say about 3" in advance and beyond each bar. Thus, it would not be necessary to maintain coils 22 ineffective until coils 22' and 22" could be rendered effective, but coils 22 could be rendered effective again just as soon as it had passed some 3" beyond the angle bar even though coils 22' and 22" were still in the region of distortion of the angle bar. This construction enabled me to test much closer to angle bars than had previously been the case, and by this construction fissures were found within the region 3" to 9" from the ends of the angle bar, which heretofore could not be tested.

The solution which I provide in my co-pending application Serial No. 395,918 is here improved upon in the respect that I am enabled to cut down the number of joint fingers which are necessary to operate the device, and thus as set forth in the introduction hereto, I am enabled to cut down the amount of servicing and thus lengthen the life of the device. Also, I do not provide a joint finger at the leaving end of the angle bar to render the indicating means again effective because the movement of the rear joint finger in previous devices consumed a given time interval which corresponded to a given length of rail for a given speed of movement of the car. If the car moved at a different speed a different length of rail would remain untested. By my present construction I eliminate the rear joint finger and provide a mechanism whereby the indicating means is rendered effective at a given point beyond the leaving end of the angle bar independent of the speed of movement of the car.

Figure 2:
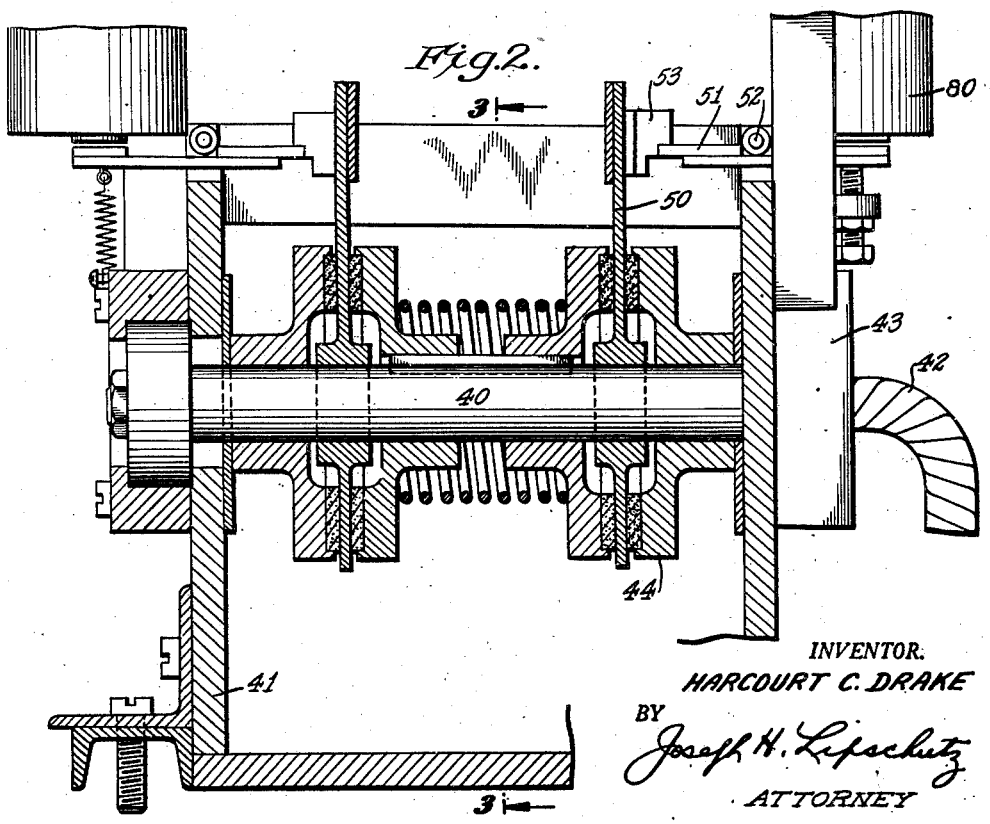
Fig. 2 is a vertical section through the cams and drive mechanism therefor.
Figure 3:
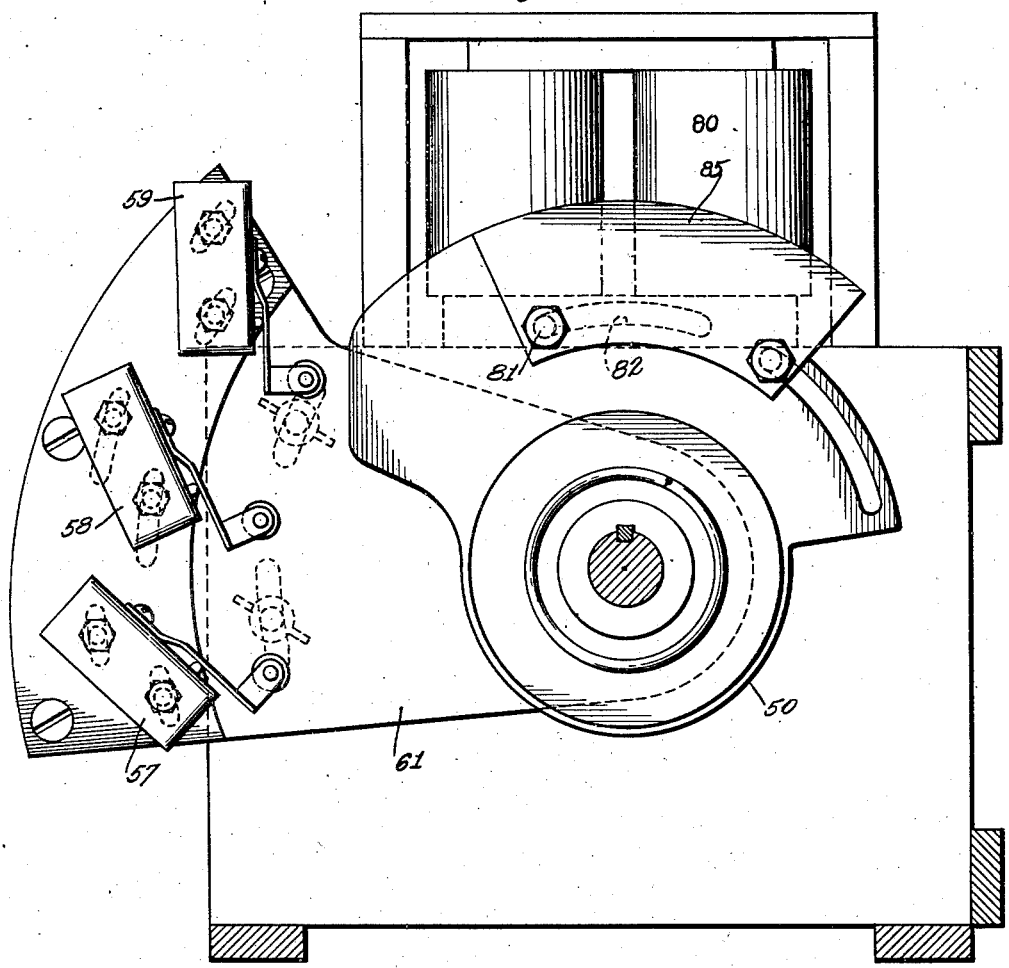
Fig. 3 is an end view of the Fig. 2 device.
Figure 4:
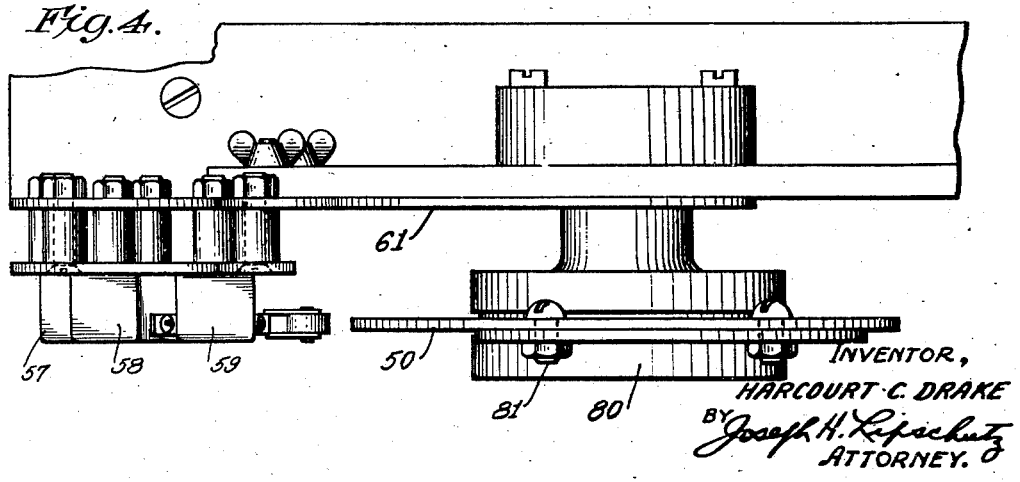
Fig. 4 is a plan view of a portion of the Fig. 3 device.

To accomplished these results I mount within the car body a shaft 40 (see Fig. 2) in a fixed frame 41, the said shaft being driven from the car axle by any suitable means such as a flexible shaft 42 connected to the shaft 40 through reduction gearing 43 and a friction clutch 44. Upon said shaft 40 there is mounted a cam 50 normally held against rotation by means of a latch 51, pressed by spring 52 into the path of a lug 53 fixed to the cam. As the car moves along the rail the shaft 40 turns at a rate which is a function of the speed of movement of the car, but the cam 50 is held against rotation by reason of the latch 51 and the friction clutch 44. When the detector mechanism approaches the region of distortion caused by an angle bar, the cam 50 is designed to be released by releasing catch 51, and thus permit it to rotate with shaft 40 at a rate which is a function of the speed of the car to operate short circuiting means for short circuiting the respective pairs of coils of the detector mechanism. An independent short circuit is provided for each pair of coils to short circuit the respective input channel to the amplifier, whereby the time during which the short circuit begins and ends may be independently controlled for each separate pair of coils. Thus cam 50 is provided with a cam projection 55 (see Fig. 5), the forward edge 56 of which is designed to engage successively micro switches 57, 58 and 59, which control the short circuit of pairs of coils 22, 22' and 22" respectively. The length of time that each input channel in the amplifier is short circuited depends upon the arcuate length of projection 55, that is, the distance between its leading edge 56 and its leaving edge 60. The length of this projection is such as to correspond to the position on the rail of each pair of coils from a point about 3" in advance of the angle bar to a point about 3" beyond the angle bar. This distance is independent of the speed of movement of the car, since a given angular movement of cam 50 corresponds to a given distance of movement of the car along the rail irrespective of the car speed. It will now be seen that each pair or coils is short circuited and again rendered effective independently of the other pairs of coils so that it is not necessary to maintain all pairs of coils ineffective until the last of them has left the region of angle bar distortion, and also it is not necessary to render all of them ineffective as soon as the first of them has entered the region of angle bar distortion.

For rendering the latch 51 ineffective so that it will release cam 50 and start the movement of said cam to render the pairs of coils successively ineffective, I may rely upon a joint cutout finger on one side of the rail head, but I prefer to employ joint cutout fingers 70 and 71 cooperating with opposite sides of the rail head. The purpose of utilizing two fingers on opposite sides of the head is set forth in my co-pending application Serial No. 395,918, wherein it was pointed out that occasionally if a single finger is used a high spike or other projection which is not an angle bar may operate this finger. Therefore I employ two fingers on opposite sides of the rail head so that both must be actuated, as is the case at a rail joint, in order to close the control circuit. When said fingers 70 and 71 engage an angle bar they are swung about their pivotal mountings to close sets of contacts 72, 73, and thus close a circuit from a source of power 74 through a magnet 75 which attracts its armature 76 to close a set of contacts 77, and thus energize a magnet 80 which attracts the latch 51 out of the path of lug or stop 53 to permit the cam 50 to be driven by shaft 40 through the frictional drive 44. The leading edge 56 of projection 55 is spaced from the micro switch 57 controlling the short circuit of the input of coils 22 into the amplifier, an angular distance corresponding to a movement of approximately 3" along the rail. Thus when fingers 70 and 71 have engaged the angle bar and cam 50 starts to rotate, the further movement of the car will cause leading edge 56 to engage switch when the coils 22 are about 3" from the angle bar to short circuit the input of coils 22 into the amplifier. This input will remain short circuited while switch 57 engages projection 55, and the angular distance of projection 55 is such that switch 57 will ride off the leaving end 60 of the projection when the car has passed about 3" beyond the leaving end of the angle bar. At this point the short circuit of coils 22 will be rendered ineffective, and coils 22 will take up their detection duties. Similarly, switches 58 and 59 are positioned further along in the circumferential path of leading edge 56 of projection 55 so that when coils 22' are about 3" in advance of the angle bar, leading edge 56 will engage switch 58, and when coils 22" are about 3" from the angle bar leading edge 56 will engage switch 59. These switches also will ride off the projection 55 successfully as these pairs of coils reach a point about 3" beyond the leaving end of the angle bar.

From the above, it will be seen that I employ but a single set of joint fingers in place of the plurality of sets of joint fingers which were heretofore necessary for independently and separately cutting out the action of the respective pairs of detector coils. Furthermore, since the drive of the cam disc is definitely linked to the movement of the car, the rendering of the coils ineffective and effective takes place at the constant distance in advance of and beyond the angle bars and is independent of the speed of the car.

The set of switches 57, 58 and 59 may be mounted upon a member 61, which is movable about the center of cam disc 50 so that the position of said switches with respect to the leading edge 56 may be adjusted to cause the cutout to become effective at a greater or lesser distance in advance of the angle bar. For the same reason the projection 55 is adjustable so that the rear end 60 thereof may engage the switches at an adjustable angle to permit the coils to be rendered effective at a greater or lesser distance after the coils have left the angle bar. For this purpose there is mounted upon the cam disc 50 a member 85 adjustable by pin and slot connection 81, 82 with respect to the center of cam disc 50. The circumference of member 85 forms an extension of projection 55 which can thus be made longer or shorter to determine the distance beyond the leaving end of the angle bar at which the pairs of coils are to be rendered successively effective.

In addition to the switches 57, 58 and 59 which are adapted to be engaged by the cam projection 55 there is also a switch 83 positioned so that it engages the leading edge 56 almost as soon as the cam disc 50 starts to rotate. This switch, unlike switches 57, 58 and 59, which are normally open, is normally closed, and engagement of the switch with edge 56 opens the switch to break a circuit and operate what is known as a low current pen. The pen will therefore indicate on the chart the extent of the joint because the switch 82 remains open until it has passed beyond the edge 60.

All of the description hereinbefore applies to the rail flaw detector mechanism and the joint cutout mechanism which cooperates with one rail. The mechanism is duplicated for the other rail, all of the parts being shown with similar numerals primed. The magnetic latch of the duplicate mechanism is controlled by a magnet 80' in a circuit controlled by contacts 77' which are in turn controlled by magnet 75' in the circuit of joint cutout fingers 70' and 71'.

When the car approaches a road crossing it is necessary to render the equipment inoperative because the planks, etc., adjacent the track would close the joint cutout fingers at both sides of each rail and therefore operate the cam discs in the same manner as an angle bar. Therefore there is provided in the circuit of magnet 75 and 75' a driver's cutout switch 90 designed to be operated by the driver when he sees such rail condition approaching. Closing of switch 90 energizes a magnet 91 which breaks sets of contacts 92 and 93 which are in the circuits of magnets 75 and 75' respectively, and thus prevents the circuit magnets 80 and 81' from being energized. When the crossing is passed the driver opens switch 90 which deenergizes magnet 91, closes contacts 92 and 93 to render the magnets 75 and 75' again effective.

If the cutouts 70, 71, 70' and 71' were again rendered effective when they were in the middle of an angle bar, the cam discs would be tripped and would start rotating. Since such rotation cuts out the indicatoin for a given length of rail equal to a distance beginning about 3" in advance of the angle bar and ending about 3" beyond the end of the angle bar, it can readily be seen that if the cam discs started to rotate when the joint fingers were on the middle of an angle bar it would result in a portion of rail being untested which should be tested, and a portion of rail being tested which should not be tested. To prevent this condition from arising the circuit through magnet 91 is controlled not merely by the driver's cutout switch 90 but also by sets of contacts 94 and 95, which contacts are closed when contacts 92 and 93 are open. Thus when the contacts 72, 73 or 72', 773' are closed by reason of the fact that the fingers are on an angle bar, the circuit through magnet 91 remains closed by way of contacts 94 and 95 even though switch 90 is open. Therefore it is not unitl the joint cutout fingers leave the angle bar that magnet 91 can be deenergized to permit contacts 92 and 93 to be closed to render the magnets 75 and 75' again effective.

In parallel with switch 90 designed to be operated by the driver of the car, there must be provided a switch 90' in the operators' compartment so that the operator also may render the joint cutout mechanism ineffective.

In a modified form of the invention as disclosed in Fig. 6, instead of employing a snigle cam disc such as disc 50 adapted to engage a plurality of switches in succession, a plurality of cam discs 100, 101, 102 may be employed, one for each switch. In this case the switches are arranged transversely in line, and the cam projections 105, 106, 107 are so positioned that their leading edges will engage the switches in proper time sequence.

In this form of the invention instead of adjusting the length of cam projection 105, 106, 107 to determine the point at which the switches leave the projection and the joint cutouts again become effective, two sets of switches may be employed, one set 108, 109, 110 connected in parallel with a set of switches 108', 109', 110', the latter set being spaced from the first set around the circumference of the cam discs. Each set of switches may be mounted on an adjustable panel so that each set may be positioned to determine the exact point of cut off where the detector mechanism is rendered ineffective, and the exact points where the detector mechanism is again rendered effective. In this manner the cutout may be adjusted for various lengths of angle bars without the necessity of changing the length of cam projection. By adjusting the position of switches 108, 109 and 110 with respect to the leading edges of projections 105, 106 and 107 the exact time at which the detector mechanism is rendered ineffective is determined. These switches ride upon the projections and before they leave the same, the second set of switches 108', 109' and 110' ride upon the projections, and since they are connected in parallel with the first set of switches they will keep the detector mechanism ineffective. The second set of switches is also mounted upon an adjustable panel which can be adjusted with respect to the center of the cam discs to determine the exact point where these switches will leave the cam projections, and the detector mechanism again becomes effective.

Figure 5:
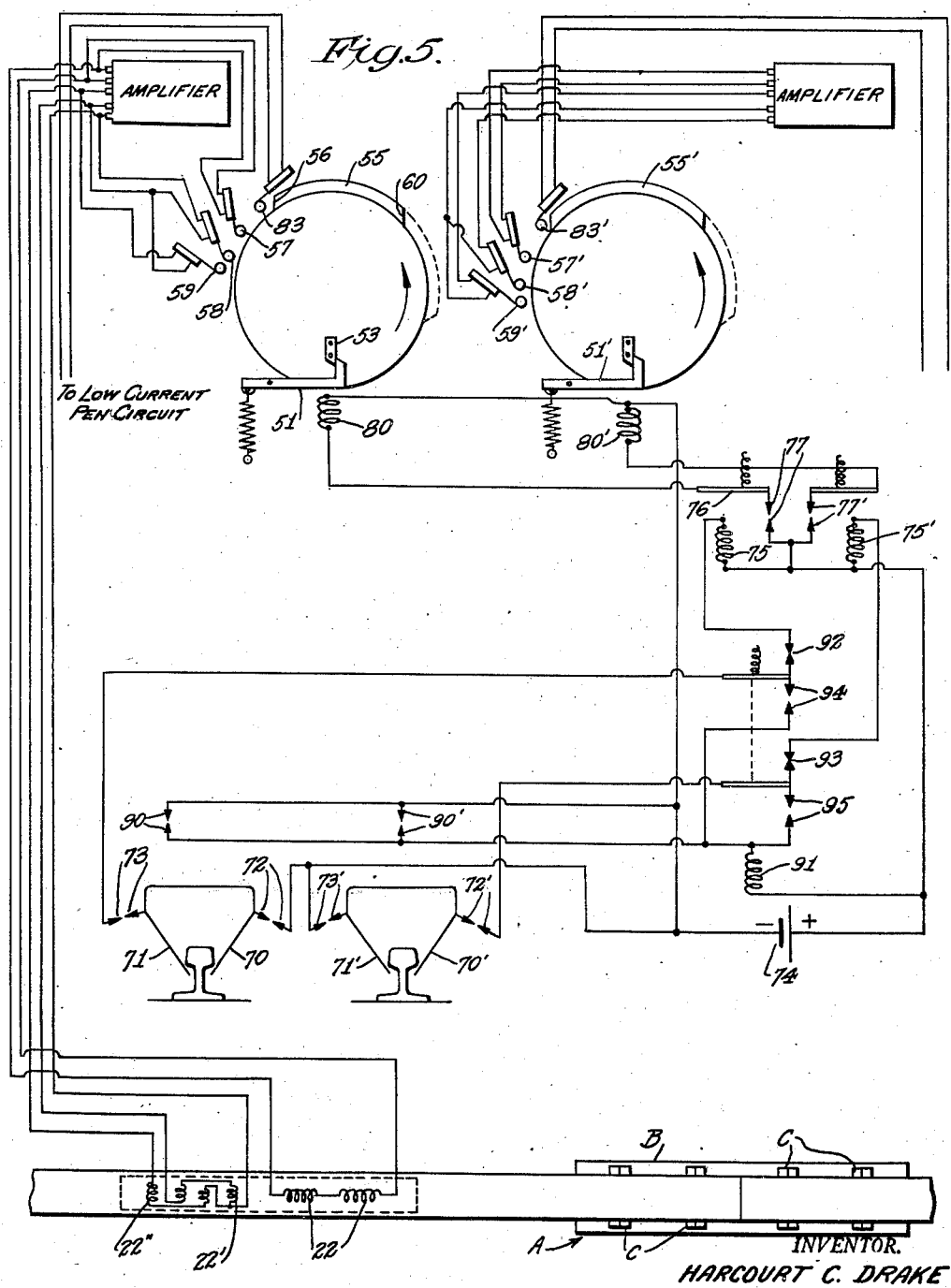
Fig. 5 is a wiring diagram of the invention.
Figure 7:
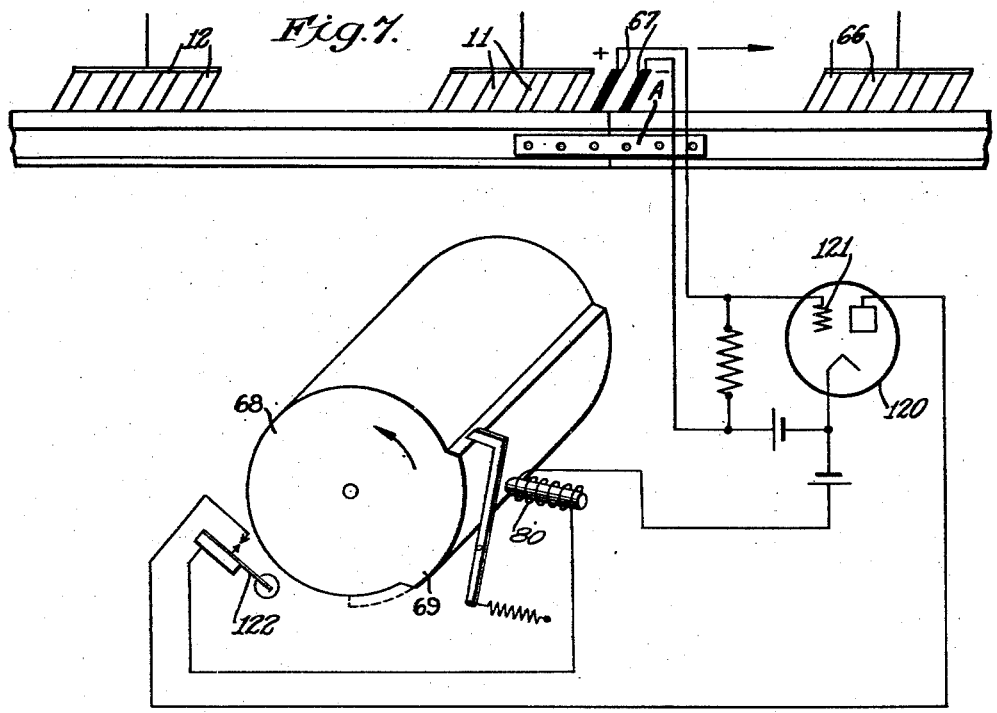
Fig. 7 is a view similar to Figs. 5 and 6 showing a further modification of my invention.

Other means than those shown in Figs. 1 and 5 for controlling the setting in motion of the cam discs may be employed. As described, joint fingers are caused to contact the angle bar on either side of the rail head and these control the circuits which energize the unlatching magnets 80, 80'. It has been stated that one of the improvements which have been obtained by this invention over that disclosed in my co-pending prior application Serial No. 395,918 is the reduction in the number of joint fingers, and consequently in the lessening of the amount of servicing and in increasing the reliability of operation. This advantage may be carried still further by adopting a joint responsive means which does not rely upon the pivoted fingers which engage the angle bar. One such arrangement is disclosed in Fig. 7 which relies upon the fundamental construction of the Sperry rail flaw detector car which employs a series of advance brushes 66 for pre-energizing the rail ahead of the portion contained between the two sets of main current brushes 11 and 12. The potential drop ahead of the first set of main brushes 11 is normally on the order of 4 mv. and a set of potential contact measuring brushes 67 positioned on the current brush carriage in advance of the leading main current brushes would normally pick off this potential drop. However, when said brushes straddle a rail joint A the potential drop rises to the order of 100 mv. This marked increase in potential may be utilized for the purpose of setting the cam disc in motion by energizing the unlocking magnets 80 or 80'. For this purpose there may be employed a thermionic trip tube 120 upon the grid 121 of which there is normally placed the potential drop between the two potential brushes. This positive potential placed upon the grid 121 is insufficient to trip the tube, but when the brushes straddle a rail joint the sudden and large increase in potential drop does place a sufficient positive potential on the grid to cause the tube to trip and allow current to flow in the circuit which includes the unlatching magnet 80. A cam disc or roller 68, similar to cam 50, then starts to rotate, and near the end of its revolution just before it is in position to be latched once more, there is provided a switch 122 in the circuit of the tube 120 so that the circuit is broken by the cam projection engaging said switch, thus restoring the tube to its untripped position, deenergizing magnet 80 and allowing the latch to become once more effective. The parts are then in position for the next joint cutout operation. The cam carries a projection 69 similar to projection 55 and engages the same micro switches shown in Fig. 5.

Figure 8:
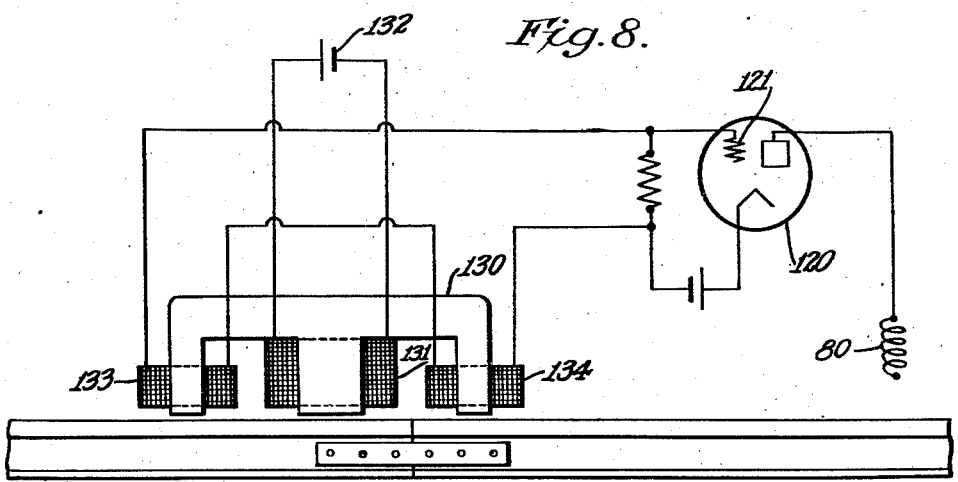
Fig. 8 is a view largely diagrammatic showing a modified form of rail joint pickup mechanism.

Still another modification wherein no pivoted joint cutout fingers are employed is disclosed in Fig. 8. In this form an E-shaped magnet 130 is mounted on the current brush carriage wih a coil 131 on its center leg energized from any suitable source of A. C. or D. C. 132. Upon the other legs are wound coils 133, 134 which are connected in opposition in a circuit designed to place the potential drop thereof upon the grid 121 of the trip tube 120. When the front leg of this unit passes over a rail joint there is a reduction in flux through the front leg and a corresponding increase in flux through the rear leg. The currents induced by these flux changes are added together to form an output which is sufficient to trip the tube 120 and energize the unlatching magnet 80.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail fissure detector car adapted to move over the rails for detecting rail flaws, flaw indicating mechanism, means responsive to flaw and adapted to actuate said indicating mechanism, said rails having joints, said flaw responsive means responding also to joints, a second means responsive to joints and adapted to cooperate with said joints before said flaw responsive means is in a position to be affected by said joints, a rotatable member normally held against rotation, means whereby said second responsive means causes rotation of said member in response to a joint, and means whereby said member renders said flaw responsive means ineffective to actuate said indicating mechanism during a predetermined angular rotation of said member, said last named means comprising a cam carried by said member, a switch positioned in the path of said cam to be actuated thereby, and means whereby the position of the switch with respect to the leading edge of the cam may be varied to vary the length of rail in advance of the joint which remains untested.

2. In a rail fissure detector car adapted to move over the rails for detecting rail flaws, flaw indicating mechanism, means responsive to flaw and adapted to actuate said indicating mechanism, said rails having joints, said flaw responsive means responding also to joints, a second means responsive to joints and adapted to cooperate with said joints before said flaw responsive means is in a position to be affected by said joints, a rotatable member normally held against rotation, means whereby said second responsive means causes rotation of said member in response to a joint, and means whereby said member renders said flaw responsive means ineffective to actuate said indicating mechanism during a predetermined angular rotation of said member, said last named means comprising a cam carried by said member, a switch positioned in the path of said cam to be actuated thereby, means whereby the position of the switch with respect to the leading edge of the cam may be varied to vary the length of rail in advance of the joint which remains untested, and means whereby the length of the cam may be varied at its leaving end to vary the length of rail beyond the joint which remains untested.

3. In a rail fissure detector car adapted to move over the rails for detecting rail flaws, flaw indicating mechanism, means responsive to flaw, said responsive means comprising a plurality of inductive means arranged longitudinally of the rail, an amplifier having a plurality of input channels, each of said inductive means being adapted to operate into one of the said channels, the output of said amplifier being adapted to actuate said indicating means, said rails having joints, said flaw responsive means responding also to joints, a second means responsive to joints and adapted to cooperate with said joints before the first of said inductive means is in a position to be affected by said joints, a rotatable member adapted to be operated at a speed bearing a fixed relation to the speed of the car, means for normally holding said member against rotation, means whereby said second responsive means renders said holding means ineffective and causes rotation of said member in response to a joint, and means whereby said member renders said inductive means successively ineffective to actuate said indicating mechanism during a predetermined angular rotation of said member as each of said indicating means reaches a position to be affected by said joints.

4. In a rail fissure detector car adapted to move over the rails for detecting rail flaws, flaw indicating mechanism, means responsive to flaw, said responsive means comprising a plurality of inductive means arranged longitudinally of the rail, an amplifier having a plurality of input channels, each of said inductive means being adapted to operate into one of the said channels, the output of said amplifier being adapted to actuate said indicating means, said rails having joints, said flaw responsive means responding also to joints, a second means responsive to joints and adapted to cooperate with said joints before the first of said inductive means is in a position to be affected by said joints, a rotatable member adapted to be operated at a speed bearing a fixed relation to the speed of the car, means for normally holding said member against rotation, means whereby said second responsive means renders said holding means ineffective and causes rotation of said member in response to a joint, and means whereby said member renders said inductive means successively ineffective to actuate said indicating mechanism during a predetermined angular rotation of said member as each of said indicating means reaches a position to be affected by said joints, said last named means comprising a short circuit for each of said input channels, a switch in each of said circuits, and a cam carried by said member, said switches being arranged to engage said cam in succession.

5. In a rail fissure detector car adapted to move over the rails for detecting rail flaws, flaw indicating mechanism, means responsive to flaw, said responsive means comprising a plurality of inductive means arranged longitudinally of the rail, an amplifier having a plurality of input channels, each of said inductive means being adapted to operate into one of said channels, the output of said amplifier being adapted to actuate said indicating means, said rails having joints, said flaw responsive means responding also to joints, a second means responsive to joints and adapted to cooperate with said joints before the first of said inductive means is in a position to be affected by said joints, a plurality of rotatable members mounted on a single axis in fixed relation and adapted to be operated at a speed bearing a fixed relation to the speed of the car, means for normally holding said members against rotation, means whereby said second responsive means renders said holding means ineffective and causes rotation of said members in response to a joint, and means whereby said members render said inductive means successively ineffective to actuate said indicating mechanism during a predetermined angular rotation of said members as each of said inductive means reaches a position to be affceted by said joints, said last named means comprising a short circuit for each of said input channels, a switch in each of said circuits, and a cam carried by each of said members, said switches being arranged in alignment transverse to the planes of rotation of said members, and said cams being arranged to engage the respective switches successively.

6. In a rail fissure detector car adapted to move over the rails for detecting rail flaws, flaw indicating mechanism, means responsive to flaw, said responsive means comprising a plurality of inductive means arranged longitudinally of the rail, an amplifier having a plurality of input channels, each of said inductive means being adapted to operate into one of said channels, the output of said amplifier being adapted to actuate said indicating means, said rails having joints, said flaw responsive means responding also to joints, a second means responsive to joints and adapted to cooperate with said joints before the first of said inductive means is in a position to be affected by said joints, a plurality of rotatable members mounted on a single axis in fixed relation and adapted to be operated at a speed bearing a fixed relation to the speed of the car, means for normally holding said members against rotation, means whereby said second responsive means renders said holding means ineffective and causes rotation of said members in response to a joint, means whereby said members render said inductive means successively ineffective to actuate said indicating mechanism during a predetermined angular rotation of said members as each of said inductive means reaches a position to be affected by said joints, said last named means comprising a short circuit for each of said input channels, a switch in each of said circuits, and a cam carried by each of said members, said switches being arranged in alignment transverse to the planes of rotation of said members, and said cams being arranged to engage the respective switches successively, and means under control of an operator in the car for rendering said second responsive means ineffective to cause rotation of said member.

7. In a rail fissure detector car adapted to move over the rails for detecting rail flaws, flaw indicating mechanism, means responsive to flaw and adapted to actuate said indicating mechanism, said rails having joints, said flaw responsive means responding also to joints, a second means responsive to joints and adapted to cooperate with said joints before said flaw responsive means is in a position to be affected by said joints, a rotatable member normally held against rotation, means whereby said second responsive means causes rotation of said member in response to a joint, means whereby said member renders said flaw responsive means ineffective to actuate said indicating mechanism during a predetermined angular rotation of said member, and means under control of an operator in the car for rendering said second responsive means ineffective to cause rotation of said member, said last named means comprising an electric circuit and a switch in said circuit.

8. In a rail fissure detector car adapted to move over the rails for detecting rail flaws, flaw indicating mechanism, means responsive to flaw and adapted to actuate said indicating mechanism, said rails having joints, said flaw responsive means responding also to joints, a second means responsive to joints and adapted to cooperate with said joints before said flaw responsive means is in a position to be affected by said joints, a rotatable member normally held against rotation, means whereby said second responsive means causes rotation of said member in response to a joint, means whereby said member renders said flaw responsive means ineffective to actuate said indicating mechanism during a predetermined angular rotation of said member, means under control of an operator in the car for rendering said second responsive means ineffective to cause rotation of said member, said last named means comprising an electric circuit and a switch in said circuit, and means whereby said operator is prevented from rendering said second responsive means again effective to cause rotation of said member while said second responsive means cooperates with a joint, said last named means comprising a holding circuit for maintaining said first circuit ineffective and adapted to be rendered effective while said second responsive means cooperates with a joint.

9. In a rail fissure detector car adapted to move over the rails for detecting rail flaws, said car having means for passing current through rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, potential contacts carried by said car and adapted to engage the rail surface, said contacts being so positioned with respect to the flaw responsive means that they straddle a rail joint before said flaw responsive means is in position to be affected by the joint, means responsive to the sudden increase in potential drop between said contacts when the contacts straddle the joint for causing rotation of said member, and means whereby said member renders said flaw responsive means ineffective to actuate said mechanism during a predetermined angular rotation of said member.

10. In a rail fissure detector car adapted to move over the rails for detecting rail flaws, said car having means for passing current through the rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, potential contacts carried by said car and adapted to engage the rail surface, said contacts being so positioned with respect to the flaw responsive means that they straddle a rail joint before said flaw responsive means is in position to be affected by the joint, a thermionic trip tube adapted to be tripped by the sudden increase in potential drop between said contacts when the contacts straddle the joints, means whereby tripping of said tube causes rotation of said member, and means whereby said member renders said flaw responsive means ineffective to actuate said mechanism during a predetermined angular rotation of said member.

11. In a rail fissure detector car adapted to move over the rails for detecting rail flaws, said car having means for passing current through the rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, potential contacts carried by said car and adapted to engage the rail surface, said contacts being so positioned with respect to the flaw responsive means that they straddle a rail joint before said flaw responsive means is in position to be affected by the joint, a thermionic trip tube adapted to be tripped by the sudden increase in potential drop between said contacts when the contacts straddle the joints, means whereby tripping of said tube causes rotation of said member, means whereby said member renders said flaw responsive means ineffective to actuate said mechanism during a predetermined angular rotation of said member, and means whereby the current flow through said tube is broken after said member is rotated through said predetermined angular distance.

12. In a rail fissure detector car adapted to move over the rails for detecting rail flaws, said car having means for passing current through the rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, a flux responsive device carried by said car adjacent the rail surface and so positioned with respect to the flaw responsive means that said device cooperates with the rail joint before said flaw responsive means is in position to be affected by the joint, means responsive to the variations in flux in said device caused by the joint for causing rotation of said member, and means whereby said member renders said flaw responsive means ineffective to actuate said mechanism during a predetermined angular rotation of said member.

13. In a rail fissure detector car adapted to move over the rails for detecting rail flaws, said car having means for passing current through the rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, an E-shaped electromagnet carried by said car so that the arms of the E project toward the rail surface and are positioned longitudinally along the rail, coils surrounding each of said arms, the coils surrounding the central arm being connected to a source of power, the coils surrounding the other arms being equal and connected in opposition, the electromagnet being so positioned with respect to the flaw responsive means that it cooperates with the rail joint before the flaw responsive means is in position to be affected by the joint, a thermionic trip tube adapted to be tripped by the sudden generation of voltage caused by said electromagnet passing over a rail joint, means whereby tripping of the tube causes rotation of said member, and means whereby said member renders said flaw responsive means ineffective to actuate said mechanism during a predetermined angular rotation of said member.

14. In a rail fissure detector car adapted to move over the rails for detecting rail flaws, said car having means for passing current through the rail to establish an electromagnetic field surrounding the rail, flaw indicating means, means responsive to variations in said field caused by flaws and adapted to actuate said mechanism, said flaw responsive means responding also to variations in said field caused by joints, a rotatable member normally held against rotation, an E-shaped electromagnet carried by said car so that the arms of the E project toward the rail surface and are positioned longitudinally along the rail, coils surrounding each of said arms, the coils surrounding the central arm being connected to a source of power, the coils surrounding the other arms being equal and connected in opposition, the electromagnet being so positioned with respect to the flaw responsive means that it cooperates with the rail joint before the flaw responsive means is in position to be affected by the joint, a thermionic trip tube adapted to be tripped by the sudden generation of voltage caused by said electromagnet passing over a rail joint, means whereby tripping of the tube causes rotation of said member, means whereby said member renders said flaw responsive means ineffective to actuate said mechanism during a predetermined angular rotation of said member, and means whereby the current flow through said tube is broken after said member has rotated through said predetermined angular distance.

HARCOURT C. DRAKE.